(12) United States Patent
Perron et al.

(10) Patent No.: US 10,207,468 B2
(45) Date of Patent: Feb. 19, 2019

(54) INSTALLATION TOOL AND ASSOCIATED METHOD FOR APPLYING A PATCH TO A SURFACE

(71) Applicant: The Boeing Company, Chicago, IL (US)

(72) Inventors: Daniel J. Perron, Federal Way, WA (US); Michael W. Evens, Auburn, WA (US); Jeffrey H. Olberg, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 118 days.

(21) Appl. No.: 14/547,643

(22) Filed: Nov. 19, 2014

(65) Prior Publication Data

US 2016/0136941 A1 May 19, 2016

(51) Int. Cl.
*B29C 73/12* (2006.01)
*B29C 73/10* (2006.01)
(Continued)

(52) U.S. Cl.
CPC .............. *B29C 73/10* (2013.01); *B29C 73/12* (2013.01); *B30B 5/02* (2013.01); *B29C 2043/3649* (2013.01)

(58) Field of Classification Search
CPC ..................... B29C 73/12; B29C 2043/3649
(Continued)

(56) References Cited

U.S. PATENT DOCUMENTS 3,661,683 A * 5/1972 Engel ..................... B29C 73/00
100/211
3,950,210 A * 4/1976 Gibbs ..................... B29C 51/10
100/322
(Continued)

FOREIGN PATENT DOCUMENTS

EP           2 457 718 A2    5/2012
WO    WO 2012/050712 A2    4/2012

OTHER PUBLICATIONS

U.S. Application for U.S. Appl. No. 13/847,625, filed Mar. 20, 2013.
(Continued)

*Primary Examiner* — Scott W Dodds
(74) *Attorney, Agent, or Firm* — Alston & Bird LLP (57) ABSTRACT

An installation tool and method are provided to apply a patch to a structure while controlling the porosity in the bond line. An installation tool is provided that includes a frame defining an internal cavity. The installation tool also includes a flexible membrane that divides the internal cavity into a first chamber proximate the surface and a second chamber separated from the surface by the first chamber and the flexible membrane. The flexible membrane is releasably attached to the patch such that the patch faces the surface. The frame includes first and second vacuum ports into the first and second chambers, respectively, such that pressure therewithin is separately controllable. The pressure within the first and second chambers is controlled such that the adhesive is degassed while the patch remains spaced from the surface and the flexible membrane is thereafter caused to be stretched to urge the patch toward the surface.

20 Claims, 5 Drawing Sheets

(51) Int. Cl.
  *B30B 5/02* (2006.01)
  *B29C 43/36* (2006.01)
(58) Field of Classification Search
  USPC ..................................................... 156/583.3
  See application file for complete search history.

(56) References Cited

U.S. PATENT DOCUMENTS

| | | | |
|---|---|---|---|
| 6,435,242 B1* | 8/2002 | Reis | B29C 73/12 |
| | | | 156/382 |
| 8,262,841 B2 | 9/2012 | Watson et al. | |
| 2008/0182054 A1* | 7/2008 | Ridges | B29C 70/30 |
| | | | 428/35.2 |
| 2012/0080135 A1 | 4/2012 | Evens et al. | |
| 2012/0298311 A1 | 11/2012 | Watson et al. | |

OTHER PUBLICATIONS

Office Action for German Patent Application No. 10 2015 116 734.4 dated Sep. 28, 2017, with Informal English Translation, 14 pages.

* cited by examiner

INSTALLATION TOOL AND ASSOCIATED METHOD FOR APPLYING A PATCH TO A SURFACE

TECHNOLOGICAL FIELD

An example embodiment of the present disclosure relates generally to an installation tool and an associated method for applying a patch to a surface and, more particularly, to an installation tool and an associated method for applying a patch in a manner that reduces porosity within the adhesive with which the patch is secured to the surface.

BACKGROUND

A patch, such as a doubler, may be applied to a structure in order to repair a defect or other anomaly in the surface of the structure. Oftentimes, patches must be applied in the field, such as in instances in which a structure is in a remote location or otherwise located some distance from a repair depot. In order to bond a patch to the surface of a structure undergoing the repair, an adhesive, such as a paste adhesive or a film adhesive, is applied between the patch and the surface of the structure.

During repairs performed in the field, the adhesive that bonds the patch to the structure may include voids and, as such, may be more porous than is desired. In this regard, the adhesive may be porous as a result of air that is trapped between the patch and the surface to be repaired and/or degassing of the adhesive. Additionally, a patch that is bonded to the surface of a structure in the field may have a resulting bond line that does not have a consistent thickness, but that, instead, has variations in its thickness that are greater than desired. For example, the bond line thickness may vary as a result of difficulties associated with the maintenance of a constant pressure to the patch during the application of the patch to the underlying structure.

Porosity in a bond line reduces the ultimate bond strength. In instances in which the porosity of the bond line exceeds a predetermined threshold, the patch may be required to be removed prior to treating the surface of the structure and then repeating the process of securing a patch to the surface of the structure with an effort to reduce the porosity of the adhesive with which the patch is secured to the structure. By having to repeat the repair process, the time and cost associated with the repair including the time that the structure is out of service are increased.

Additionally, even in an instance in which the porosity of the bond line satisfies the predetermined threshold, the porosity of the bond line may still exceed that desired for a more permanent repair and/or the bond line thickness may vary more than is desired. As such, upon the return of the structure to a repair depot, the patch that was applied in the field may be removed, the surface of the structure may be treated and another patch may be applied utilizing an autoclave in order to produce a bond line having an acceptable porosity and a consistent bond line thickness. The repetition of the repair in the repair depot may again increase the time and cost associated with the repair and the downtime experienced by the structure.

BRIEF SUMMARY

In an example embodiment, an installation tool is provided that is configured to apply a patch to a surface. The installation tool includes a frame defining an internal cavity. The installation tool also includes a flexible membrane coupled to the frame to divide the internal cavity into a first chamber proximate the surface and a second chamber separated from the surface by the first chamber and the flexible membrane. The flexible membrane is configured to releasably attached to the patch such that the patch faces the surface. The frame of this example embodiment includes first and second vacuum ports into the first and second chambers, respectively. As such, pressures within the first and second chambers are separately controllable.

The installation tool of an example embodiment also includes a heat blanket supported by the flexible membrane. The flexible membrane of this example includes first and second surfaces facing the first and second chambers, respectively. The first surface of the flexible membrane of this example embodiment is releasably attached to the patch and the second surface of the flexible membrane supports the heat blanket. The flexible membrane of an example embodiment includes a vacuum bag, such as may be formed of an elastomeric silicone material. The installation tool of an example embodiment may also include a boot coupled to the frame and configured to conform to a contour of the surface. The installation tool of an example embodiment may also include a cover coupled to the frame opposite the surface relative to the flexible membrane. The cover may be at least partially translucent.

In another example embodiment, a system is provided that is configured to apply a patch to a surface. The system includes a frame defining an internal cavity. The system also includes a flexible membrane, such as a vacuum bag, coupled to the frame to divide the internal cavity into a first chamber proximate the surface and a second chamber separated from the surface by the first chamber and the flexible membrane. The flexible membrane is configured to be releasably attached to the patch that is coated with an adhesive that faces the surface. The system of this example embodiment also includes a vacuum source in fluid communication with the first and second chambers. The vacuum source is configured to separately control the pressures within the first and second chambers such that the adhesive is degassed while the patch remains spaced from the surface and the flexible membrane is thereafter caused to be stretched such that the patches are toward the surface.

The vacuum source of an example embodiment is further configured to separately control the pressures within the first and second chambers to draw a vacuum in both the first and second chambers to degas the adhesive. The vacuum source of this example embodiment is further configured to separately control the pressures within the first and second chambers to continue to draw the vacuum in the first chamber while permitting the pressure within the second chamber to be greater than the pressure within the first chamber, thereby causing the flexible membrane to be stretched such that the patch is urged toward the surface and the adhesive is brought into contact with the surface. For example, the vacuum source may be configured to permit the pressure within the second chamber to be greater than the pressure within the first chamber by evacuating the second chamber to the atmosphere. The system of an example embodiment also includes a heat blanket supported by the flexible membrane. The flexible membrane of this example embodiment includes first and second surfaces facing the first and second chambers, respectively. The first surface of the flexible membrane is releasably attached to the patch and the second surface of the flexible membrane supports the heat blanket.

In a further example embodiment, a method of applying a patch to a surface is provided. The method includes dividing an internal cavity within a frame in first and second chambers with a flexible membrane. The first chamber is proximate the surface and the second chamber is separated from the surface by the first chamber and the flexible membrane. The method of this example embodiment also includes releasably attaching the patch to the flexible membrane such that the patch faces the surface. The patch, in turn, is coated with an adhesive that faces the surface. The method of this example embodiment also controls the pressures within the first and second chambers such that the adhesive is degassed while the patch remains spaced from the surface and the flexible membrane is thereafter caused to be stretched such that the patch is urged toward the surface.

The method of an example embodiment controls the pressures by drawing a vacuum in both the first and second chambers to degas the adhesive. While a vacuum is drawn in both the first and second chambers and the patch remains spaced from the surface, the adhesive may be heated to degas the adhesive. The method of this example embodiment also controls the pressures by continuing to draw the vacuum in the first chamber while permitting the pressure within the second chamber to be greater than the pressure within the first chamber, thereby causing the flexible membrane to be stretched such that the patch is urged toward the surface and the adhesive is brought into contact with the surface. The method of this example embodiment also includes permitting the pressure within the second chamber to be greater than the pressure within the first chamber by evacuating the second chamber to atmosphere.

The method of an example embodiment also includes heating the adhesive while the patch is urged toward the surface and the adhesive is in contact with the surface. The adhesive is cured as a result of the heating of the adhesive while the adhesive is in contact with the surface. In this embodiment, the method also controls the pressures by releasing the pressure within the first chamber such that the first chamber is evacuated to atmosphere after the adhesive is cured. The method of an example embodiment also includes positioning the frame upon the surface, prior to controlling the pressures, such that the patch overlies a portion of the surface to be patched.

BRIEF DESCRIPTION OF THE DRAWINGS

Having thus described aspects of the present disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

An installation tool and associated method are provided in accordance with an example embodiment in order to apply a patch to a surface of a structure, such as to repair the structure in the field, in a manner that reduces the porosity in the resulting bond line. In this regard, the installation tool and associated method may facilitate the degassing of the adhesive and may thereafter maintain the patch including the adhesive in a controlled environment while the patch is secured to the surface of the structure undergoing repair. Moreover, pressure may be applied to the patch during its application to the surface of the structure in a consistent manner across the entire surface of the patch such that the resulting bond line has a consistent thickness. As a result, the installation tool and associated method of example embodiments of the present disclosure permit a patch to be applied, such as in the field without the use of an autoclave, in a manner that produces a bond line having an acceptable bond strength.

By way of example, the installation tool and associated method may be configured to apply a patch, such as a doubler, to the surface of an aircraft, a land-based vehicle, a ship or other marine vehicle or the like. However, the installation tool and associated method may be configured to apply a patch to other types of structures in addition to, or instead of vehicles.

Additionally, the installation tool and associated method are configured to apply various types of patches, such as based upon the surface of the structure to be patched, e.g., repaired. For example, the patch, such as a doubler, may be formed of a metallic material, a composite material or the like. Regardless of the type of patch and the underlying structure, the installation tool and associated method are configured to affect the repair such that the resulting bond line has an acceptable porosity, such as the porosity below a predetermined threshold, and to have an acceptable consistency in terms of bond line thickness, such as by producing a bond line that varies in thickness by no more than a predetermined amount. Thus, the patch that is applied by the installation tool and associated method of an example embodiment need not be removed and the repair process need not be repeated, either in the field or in a repair depot utilizing an autoclave. Consequently, the time and expense associated with the repair as well as any down time of the structure may be reduced.

Figure 1:
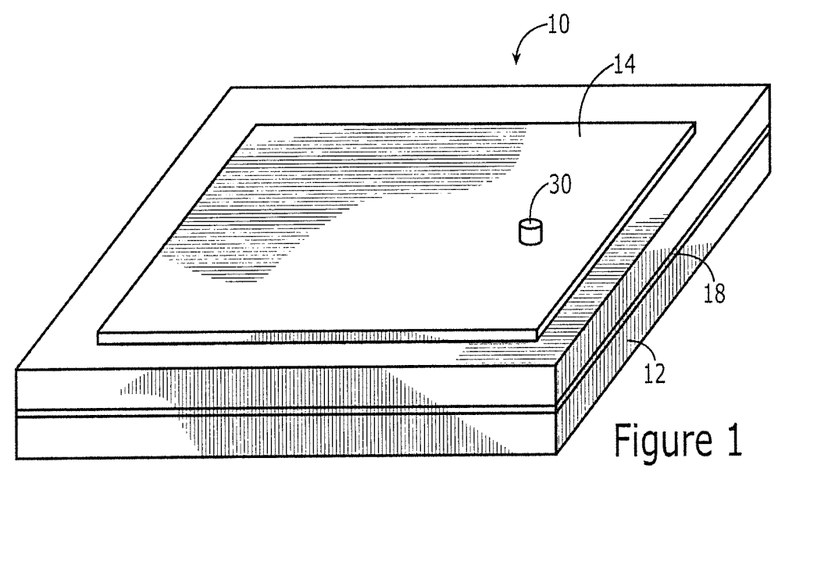
FIG. 1 is a perspective view of an installation tool in accordance with an example embodiment of the present disclosure.
Figure 2:
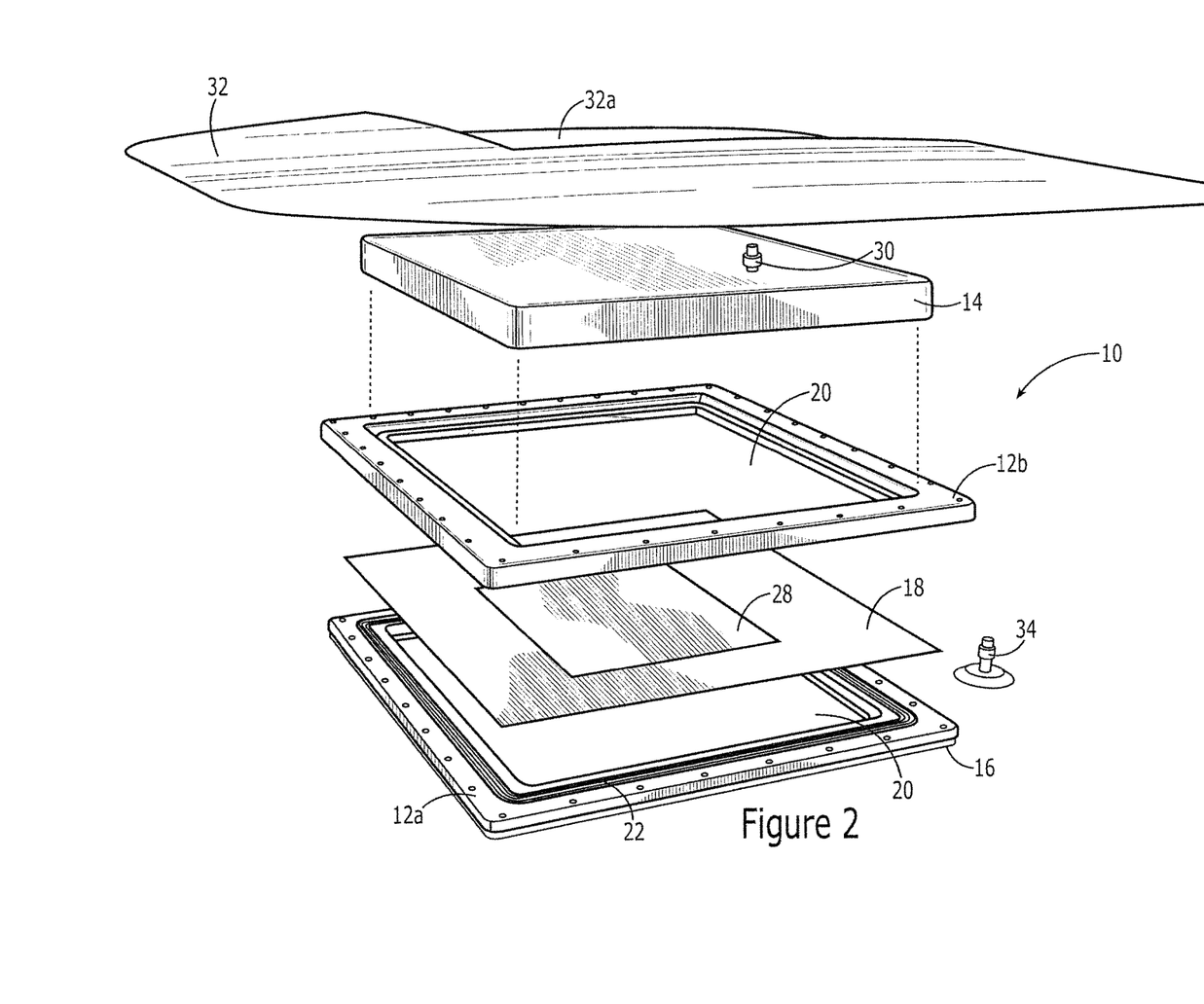
FIG. 2 is an exploded perspective view of the installation tool of FIG. 1.

As shown in FIGS. 1 and 2, an installation tool 10 in accordance with an example embodiment is depicted. As shown, the installation tool includes a frame 12 that defines an internal cavity 20. The frame 12 may be formed of various materials, but is formed of a metal, such as aluminum, in an example embodiment. Additionally, the frame 12 may be shaped and sized in a variety of different manners with the frame of FIG. 1 having a square shape for purposes of illustration, but not of limitation.

As also shown in FIG. 1, the installation tool 10 includes a cover 14 that is coupled to the frame 12 so as to close one end of the internal cavity 20. In this regard, the cover 14 is coupled to the frame 12 opposite a surface 13 (shown in FIG. 3) to which a patch 24 is to be applied. The cover 14 of an example embodiment is coupled to the frame 12 with a vacuum seal to penult a vacuum to be controllably established within the internal cavity 20 defined by the frame 12 in a manner as described below. Alternatively, the cover 14 and the frame 12 may be formed so as to be integral with one another. The cover 14 of an example embodiment may be formed of a material that is at least partially translucent and, in one embodiment, is transparent. For example, the cover 14 may be formed of a clear polycarbonate plate. As such, a technician may view the internal cavity 20 defined by the frame 12 through the cover 14 in order to monitor the repair process.

Figure 3:
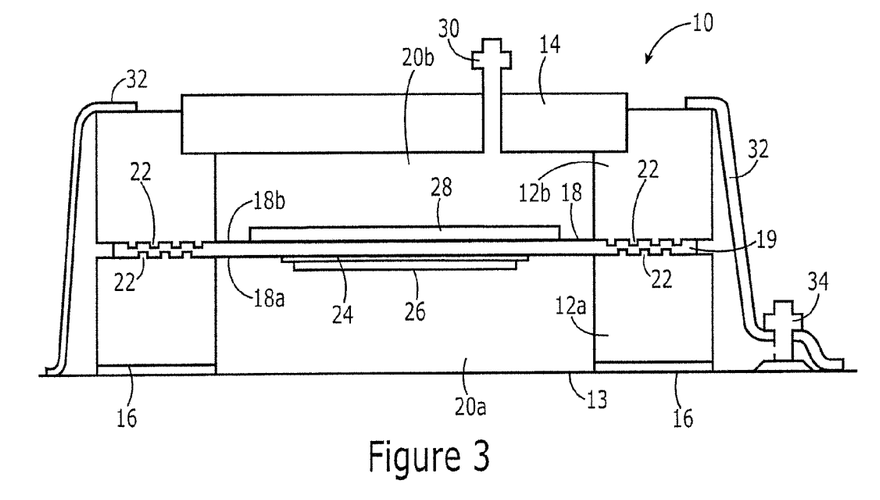
FIG. 3 is a side view of an installation tool in accordance with an example embodiment of the present disclosure in which the flexible membrane is maintained in an intermediate position.

FIG. 2 depicts an exploded perspective view of the installation tool 10 of an example embodiment. In the illustrated embodiment, the installation tool 10 includes a boot 16 coupled to the frame 12 so as to face the surface 13 to which a patch 24 is to be applied, as shown in FIG. 3. In this regard, the boot 16 may be coupled, such as with one or more mechanical fasteners, e.g., screws, to the opposite side of the frame 12 from that to which the cover 14 is coupled. The boot 16 is formed of a flexible material, such as a silicone rubber. As such, the boot 16 is configured to conform to a contour of the surface 13. Thus, the installation tool 10 may be positioned upon a structure having a surface with a complex contour with the boot 16 configured to adapt to the complex contour so as to maintain a vacuum seal between the frame 12 and the structure even though the frame 12 itself is rigid and does not conform to the contour of this surface.

As shown in FIG. 2, the installation tool 10 also includes a flexible membrane 18 coupled to the frame 12. As shown in the side view of FIG. 3, the flexible membrane 18 divides the internal cavity 20 into a first chamber 20a and a second chamber 20b. The first chamber 20a is proximate the surface 13 to which the patch 24 is to be applied, and the second chamber 20b is separated from the surface 13 by the first chamber 20a and the flexible membrane 18. The flexible membrane 18 may be coupled by the frame in various manners. In the illustrated embodiment, the frame 12 includes a first portion 12a and a second portion 12b. The first and second portions 12a, 12b of the frame 12 are separable from one another and the flexible membrane 18, such as an edge portion 19 of the flexible membrane 18, may be positioned between the first and second portions 12a, 12b of the frame 12 so as to be secured therebetween as the first and second portions 12a, 12b of the frame 12 are brought together and secured to one another.

In the illustrated embodiment, the first and second portions 12a, 12b of the frame 12 each include a machined vacuum seal 22 on the surface that faces the other portion of the frame 12. The machined vacuum seals 22 are configured to mate with one another as the first and second portions 12a, 12b of the frame 12 are brought together with the edge portion 19 of the flexible membrane 18 disposed therebetween. The first and second portions 12a, 12b of the frame 12 may then be secured to one another, such as with one or more mechanical fasteners, such that the flexible membrane 18 extends across the internal cavity 20 and divides the internal cavity 20 into the first and second chambers 20a, 20b. As shown in FIG. 3, the flexible membrane 18 is coupled to the frame 12 so as to be spaced from the surface 13 to be patched by the first chamber 20a while in an intermediate position with no vacuum drawn in either of the first or second chambers 20a, 20b.

The flexible membrane 18 acts as a vacuum bag. For example, the flexible membrane 18 may be formed of an elastomeric silicone material. The flexible membrane 18 is releasably attached to the patch 24. In this regard, the flexible membrane 18 includes a first surface 18a and a second surface 18b facing the first and second chambers 20a, 20b, respectively. In this example embodiment, the first surface 18a of the flexible membrane 18 is releasably attached to the patch 24. In the illustrated embodiment, a surface of the patch 24 that faces the surface 13 of the structure to be patched is coated with an adhesive 26, such as a film or paste adhesive, that extends across a majority, if not the entirety, of the surface of the patch 24. Alternatively or additionally, the adhesive 26 could be disposed on the surface 13 of the structure so as to underlie and be in alignment with the patch 24 releasably attached to the flexible membrane 18. In either embodiment, the adhesive 26 is exposed to the first chamber 20a within the internal cavity 20 defined by the frame 12.

In the illustrated embodiment, the installation tool 10 optionally includes a heat blanket 28. The heat blanket 28 is also supported by the flexible membrane 18, such as being secured to the flexible membrane 18. In this regard, the heat blanket 28 is supported by the second surface 18b of the flexible membrane 18, that is, the surface 18b of the flexible membrane 18 opposite the surface 18a of the flexible membrane 18 that is releasably attached to the patch 24.

Pressures within the first and second chambers 20a, 20b of the internal cavity 20 defined by the frame 12 are separately and independently controlled. As such, the adhesive 26 may be initially degassed in the first chamber 20a so as to reduce the porosity of the adhesive 26. The patch 24 may then be applied to the surface 13 of the structure with the adhesive 26 disposed therebetween in a manner that maintains the relatively low porosity of the adhesive 26 and also in a manner that maintains the consistency of the bond line thickness. In order to separately control the pressures within the first and second chambers 20a, 20b, vacuum ports may be defined into both the first and second chambers 20a, 20b. In the embodiment depicted in FIGS. 1 and 2, a vacuum port 30 into the second chamber 20b is defined through the cover 14. Although not shown, the installation tool 10 of the embodiment of FIGS. 1 and 2 also includes a vacuum port into the first chamber 20a, such as a vacuum port defined through the first portion 12a of the frame 12 so as to open into the first chamber 20a. In this regard, the installation tool 10 of the embodiment of FIG. 2 also includes an outer vacuum bag 32 that maintains a vacuum seal with the frame 12 and the surface 13 of the structure to which the patch 24 is to be applied. As will be noted, however, the vacuum port 30 into the second chamber 20b is outside of the outer vacuum bag 32 as a result of the window 32a defined by the outer vacuum bag 32 that permits the outer vacuum bag 32 to maintain a vacuum seal with peripheral portions of the frame 12 while maintaining an opening through which the vacuum port 30 extends. In this embodiment, the vacuum port into the first chamber 20a is in fluid communication with the volume within the outer vacuum bag 32. Thus, by controlling the pressure within the outer vacuum bag 32, such as via the vacuum port 34 into the outer vacuum bag 34, the pressure within the first chamber 20a is corresponding controlled.

Figure 4:
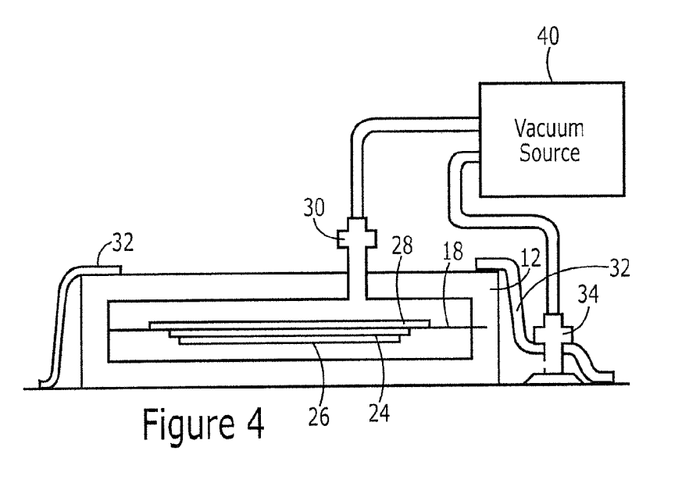
FIG. 4 is a flowchart illustrating operations performed in accordance with an example embodiment of the present disclosure.

Although vacuum ports 30, 34 may be in fluid communication with a vacuum pump 40 as shown in FIG. 4 and utilized to separately and independently control the pressures within the first and second chambers 20a, 20b, the frame 12 of another example embodiment may define a first vacuum port and a second vacuum port into the first and second chambers 20a, 20b, respectively. For example, the second vacuum port may be defined by the second portion 12b of the frame 12 opens into the second chamber 20b, while the first vacuum port may be defined by the first portion 12a of the frame 12 opens into the first chamber 20a. In this alternative embodiment, the first and second vacuum ports into the first and second chambers 20a, 20b, respectively, may be in fluid communication with a vacuum source 40 that is configured to separately control the pressures within the first and second chambers 20a, 20b.

Figure 5:
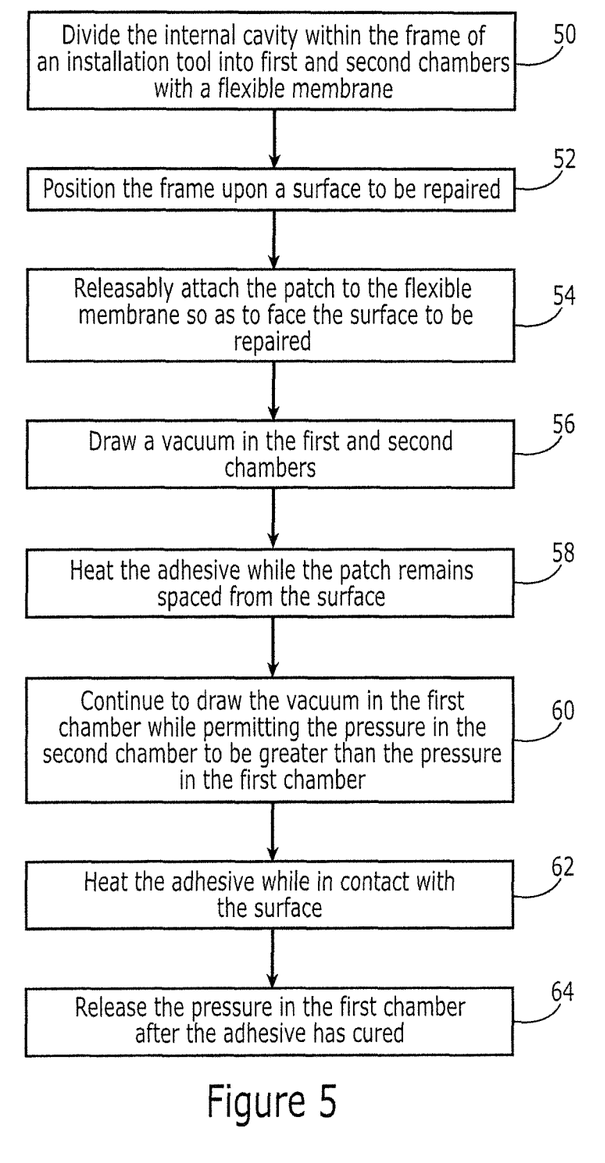
FIG. 5 is a block diagram of a system configured to apply a patch to a surface in accordance with an example embodiment of the present disclosure.
Figure 6:
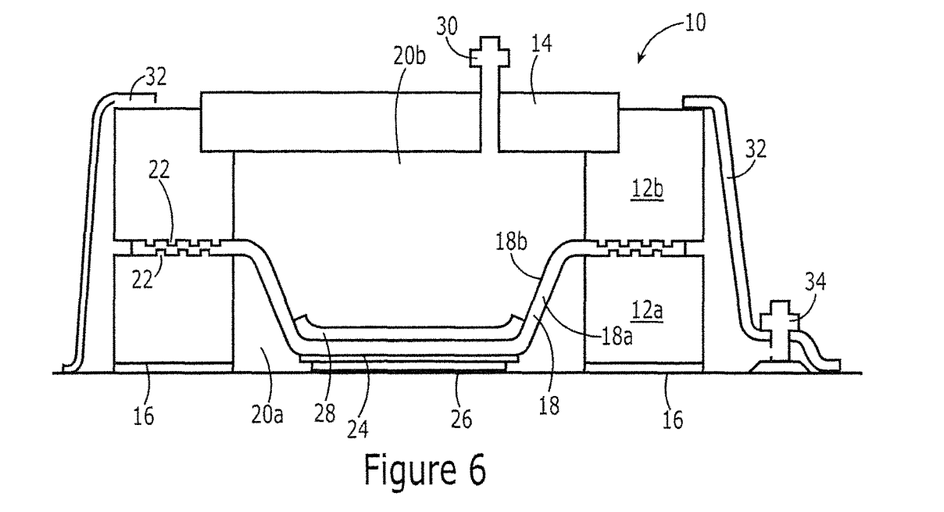
FIG. 6 is a side view of the installation tool in accordance with an example embodiment of the present disclosure in which the flexible membrane is deflected such that the adhesive with which the patch is coated is urged into contact with the surface of the structure.

As shown in the flow chart of FIG. 5, the installation tool 10 may be initially configured so as to divide the internal cavity 20 defined by the frame 12 into first and second chambers 20a, 20b with a flexible membrane 18. See block 50. The installation tool may then be positioned on a surface 13 to be patched such that the patch 24 releasably attached to the flexible membrane 18 faces and is aligned with the portion of the surface 13 to be patched. See blocks 52 and 54. The pressures in the first and second chambers 20a, 20b may then be controlled such that the adhesive 26 is degassed while the patch 24 remains spaced from the surface 13, such as by remaining in the intermediate position as shown in FIG. 3, and the flexible membrane 18 is thereafter caused to be stretched such that the patch 24 is urged toward the surface 13, such as shown in FIG. 6.

In this regard, the vacuum source 40 of an example embodiment is configured to initially draw a vacuum, e.g., a pressure that is less than the ambient pressure of the atmosphere surrounding the installation tool 10, in both the first and second chambers 20a, 20b with the vacuum in the first chamber 20a serving to degas the adhesive 26 by removing air and volatiles therefrom. See block 56 of FIG. 5. Although the vacuum source 40 may create different vacuum pressures in the first and second chambers 20a, 20b such as in an instance in which the vacuum level in the second chamber 20b exceeds the vacuum level in the first chamber 20a such that the pressure in the second chamber 20b is less than the pressure in the first chamber 20a, the vacuum source 40 of an example embodiment may draw the vacuums such that the first and second chambers 20a, 20b experience the same reduced pressure, relative to atmosphere. As such, the flexible membrane 18 remains in the intermediate state as shown in FIG. 3. In the intermediate state, the patch 24 is spaced apart from the surface 13 of the structure to be patched and the adhesive 26 exposed to the reduced pressure within the first chamber 20a. As a result of the reduced pressure, the adhesive 26 is degassed. Although the vacuum source 40 may be configured to draw various levels of a vacuum within the first and second chambers 20a, 20b, the vacuum source 40 of an example embodiment may draw a vacuum such that the pressure within both the first and second chambers 20a, 20b of the internal cavity is 28 inches mercury (inHg) (94.8 kilopascals (kPa)) during the degassing of the adhesive 26.

Optionally, while the patch 24 remains spaced from the surface 13 of the structure as a result of the vacuum being drawn in both the first and second chambers 20a, 20b, the adhesive 26 may be heated. See block 58. For example, the heat blanket 28 may be actuated in order to heat the adhesive 26 to a first temperature, greater than the ambient temperature but less than the cure temperature of the adhesive 26. As a result of the heating of the adhesive 26, the degassing of the adhesive 26 may be facilitated by removing additional air and volatile vapor from the adhesive 26, thereby improving the resulting bondline.

Once the adhesive 26 has been effectively degassed, such as following the exposure of the adhesive 26 to the reduced pressure for a predetermined period of time and, in some embodiments, following the heating of the adhesive 26 for a predefined period of time, the vacuum source 40 is configured to create a pressure differential between the first and second chambers 20a, 20b with the pressure within the second chamber 20b being greater than the pressure within the first chamber 20a. For example, the vacuum source 40 of an example embodiment is configured to continue to draw the vacuum in the first chamber 20a, while permitting the pressure within the second chamber 20b to be greater than the pressure within the first chamber 20a. See block 60 of FIG. 5. In this regard, the vacuum source 40 may cause the pressure within the first chamber 20a to remain the same as during the degassing of the adhesive 26 and may concurrently permit the pressure within the second chamber 20b to return to atmospheric pressure, such as by evacuating the second chamber 20b to atmosphere.

Although the pressure differential described above is created by an increase in pressure within the second chamber 20b, the pressure differential may, instead, be created by a further reduction in the pressure of the first chamber 20a while the pressure within the second chamber 20b remains the same. Alternatively, the pressure differential may be created by both an increase in the pressure within the second chamber 20b and a decrease in the pressure in the first chamber 20a.

As a result of the pressure differential, the flexible membrane 18 is deflected as shown in FIG. 6 and the flexible membrane 18 including the patch 24 is urged toward the surface 13 of the structure. In this regard, the pressure differential causes the flexible membrane 18 to urge the patch 24 and the adhesive 26 into operative contact with the underlying surface 13. The pressure differential between the first and second chambers 20a, 20b is then maintained while the adhesive 26 is cured. By continuing to maintain a reduced pressure, such as the same or a more greatly reduced pressure within the first chamber 20a, the reduction in the porosity of the adhesive 26 brought about by the degassing of the adhesive 26 is maintained while the adhesive 26 is brought into contact with the surface 13 of the structure and during the curing of the adhesive 26. Additionally, as a result of the flexibility of the membrane 18 and the maintenance of the pressure differential, a relatively even force is applied to the patch 24 urging the patch 24 toward the underlying surface 13 of the structure while the adhesive 26 is cured such that the resulting bond line thickness is consistent, such as by varying by no more than a predetermined amount across the patch 24.

In order to facilitate curing of the adhesive 26, the optional heat blanket 28 supported by the flexible membrane 18 may be actuated once the flexible membrane 18 has been deflected and the patch 24 is urged toward the underlying surface 13. As such, the heat blanket 18 heats the adhesive 26 and causes the adhesive 26 to be cured more evenly and more quickly. See block 62 of FIG. 5. The heat blanket 28 may be actuated in various manners. For example, electrical leads from the heat blanket 28 may extend through the frame 12 to a controller or the like to permit a technician to control operation of the heat blanket. Alternatively, the heat blanket 28 may be responsive to a wireless, remote control. Regardless of the manner in which the heat blanket 28 is actuated, the heat blanket 28 may be actuated so as to heat the adhesive 26 to its cure temperature for at least a predetermined period of time to ensure that the adhesive 26 has properly cured.

In an embodiment in which the adhesive 26 is heated while the patch 24 is spaced from the surface 13 as shown in block 58, the heat blanket 28 may be deactivated while the flexible membrane 18 is deflected and the patch 24 is brought into contact with the surface 13 prior to then reactivating the heat blanket 28. Alternatively, the heat blanket 28 may be continually activated so as to heat the adhesive 26 while the flexible membrane 18 is deflected and the patch 24 is brought into contact with the surface 13. In either instance, the heat blanket 28 may be activated so as to heat the adhesive 26 to a greater temperature, such as to at least the cure temperature of the adhesive 26, once the patch 24 has been brought into contact with the surface 13 than the temperature to which the adhesive 26 is heated while the patch 24 is spaced from the surface 13 and the adhesive 26 is heated, if at all, to a temperature less than the cure temperature.

Once the adhesive 26 has cured, the heat blanket 28 may be deactuated so as to no longer heat the adhesive 26 and the vacuum source 40 may be configured to eliminate the pressure differential between the first and second chambers 20a, 20b, such as evacuating both the first and second chambers 20a, 20b to atmosphere. See block 64 of FIG. 5. As such, the flexible membrane 18 will return to the intermediate position shown in FIG. 3. However, as a result of the curing of the adhesive 26, the patch 24 will separate from the flexible membrane 18 with the patch 24 remaining adhered to the surface 13 of the structure, thereby applying the patch 24 to the structure. In this regard, the patch 24 may have been initially and temporarily secured to the flexible membrane 18, such as with an adhesive having a bond strength significantly less than the bond strength provided by the adhesive 26 once cured. Thus, the return of the flexible membrane 18 to the intermediate position causes the patch 24 to separate from the flexible membrane 18.

The installation tool 10 may then be removed from the surface 13 and, in some instances, reused, such as by temporarily adhering another patch 24 to the flexible membrane 18, such as with an adhesive having a relatively low bond strength. Following the removal of the installation tool 10, however, the patch 24 remains secured to the surface 13 of the structure. As a result of the reduction in the porosity of the adhesive 26, the ultimate bond strength of the adhesive 26 may be sufficient to provide a repair that need not be repeated, either in the field or in a repair depot utilizing an autoclave. Moreover, the bond line thickness may be more consistent so as to further satisfy the requirements of a more permanent repair of the structure. As such, the time and expense associated with repairing a structure may, on average, be reduced, thereby correspondingly reducing the downtime of the structure and facilitating repairs in the field.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An installation tool configured to apply a patch to a surface, the installation tool comprising:

a frame comprising first and second portions and defining an internal cavity;

an outer vacuum bag configured to maintain a vacuum seal with the frame and the surface;

a flexible elastomeric membrane formed of an elastomeric material and coupled to the frame to divide the internal cavity into a first chamber proximate the surface and a second chamber separated from the surface by the first chamber and the flexible elastomeric membrane, wherein the elastomeric material of the flexible elastomeric membrane extends from a first surface facing the first chamber to an opposed, second surface facing the second chamber, wherein at least portions of the first and second surfaces of the flexible elastomeric membrane are exposed to the first and second chambers, respectively, and wherein the flexible elastomeric membrane comprises an edge portion positioned and secured between the first and second portions of the frame;

the patch carried by the flexible elastomeric membrane, wherein the patch is smaller than the flexible elastomeric membrane such that the patch is spaced apart from the frame;

a first adhesive disposed between the patch and the flexible elastomeric membrane, wherein the patch is releasably attached directly to the first surface of the flexible elastomeric membrane such that the patch faces the surface; and a second adhesive disposed between the patch and the surface, wherein the first adhesive has a bond strength that is less than a bond strength of the second adhesive, and wherein the frame defines first and second vacuum ports into the first and second chambers, respectively, such that pressures within the first and second chambers are separately controllable.

2. An installation tool according to claim 1 further comprising a heat blanket supported by the flexible elastomeric membrane, wherein the second surface of the flexible elastomeric membrane supports the heat blanket.

3. An installation tool according to claim 1 wherein the flexible elastomeric membrane comprises a vacuum bag.

4. An installation tool according to claim 3 wherein the vacuum bag is comprised of an elastomeric silicone material.

5. An installation tool according to claim 1 further comprising a boot coupled to the frame and configured to conform to a contour of the surface.

6. An installation tool according to claim 1 further comprising a cover coupled to the frame opposite the surface relative to the flexible elastomeric membrane.

7. An installation tool according to claim 6 wherein the cover is at least partially translucent.

8. An installation tool according to claim 1, wherein the second vacuum port into the second chamber is outside of the outer vacuum bag and the first vacuum port into the first chamber is in fluid communication with a volume within the outer vacuum bag.

9. An installation tool according to claim 8 wherein the outer vacuum bag defines a window through which the second vacuum port into the second chamber extends.

10. A system configured to apply a patch to a surface, the system comprising:

a frame comprising first and second portions and defining an internal cavity;
an outer vacuum bag configured to maintain a vacuum seal with the frame and the surface;
a flexible elastomeric membrane formed of an elastomeric material and coupled to the frame to divide the internal cavity into a first chamber proximate the surface and a second chamber separated from the surface by the first chamber and the flexible elastomeric membrane, wherein the elastomeric material of the flexible elastomeric membrane extends from a first surface facing the first chamber to an opposed, second surface facing the second chamber, wherein at least portions of the first and second surfaces of the flexible elastomeric membrane are exposed to the first and second chambers, respectively, and wherein the flexible elastomeric membrane comprises an edge portion positioned and secured between the first and second portions of the frame;
the patch carried by the flexible elastomeric membrane, wherein the patch is smaller than the flexible elastomeric membrane such that the patch is spaced apart from the frame;
a first adhesive disposed between the patch and the flexible elastomeric membrane, wherein the patch is releasably attached directly to the first surface of the flexible elastomeric membrane so as to face the surface;
a second adhesive disposed between the patch and the surface, wherein the first adhesive has a bond strength that is less than a bond strength of the second adhesive; and
a vacuum source in fluid communication with the first and second chambers, wherein the vacuum source is configured to separately control the pressures within the first and second chambers such that the second adhesive is degassed while the patch remains spaced from the surface and the flexible elastomeric membrane is thereafter caused to be stretched such that the patch is urged toward the surface.

11. A system according to claim 10 wherein the vacuum source is further configured to separately control the pressures within the first and second chambers to draw a vacuum in both the first and second chambers to degas the second adhesive.

12. A system according to claim 11 wherein the vacuum source is further configured to separately control the pressures within the first and second chambers to continue to draw the vacuum in the first chamber while permitting the pressure within the second chamber to be greater than the pressure within the first chamber, thereby causing the flexible elastomeric membrane to be stretched such that the patch is urged toward the surface and the second adhesive is brought into contact with the surface.

13. A system according to claim 12 wherein the vacuum source is configured to permit the pressure within the second chamber to be greater than the pressure within the first chamber by evacuating the second chamber to atmosphere.

14. A system according to claim 10 further comprising a heat blanket supported by the flexible elastomeric membrane, wherein the second surface of the flexible elastomeric membrane supports the heat blanket.

15. A system according to claim 10 wherein the flexible elastomeric membrane comprises a vacuum bag.

16. A system according to claim 10 wherein the frame defines first and second vacuum ports into the first and second chambers, respectively, such that pressures within the first and second chambers are separately controllable.

17. A system according to claim 16, wherein the second vacuum port into the second chamber is outside of the outer vacuum bag and the first vacuum port into the first chamber is in fluid communication with a volume within the outer vacuum bag.

18. A system according to claim 17 wherein the outer vacuum bag defines a window through which the second vacuum port into the second chamber extends.

19. A system according to claim 10 further comprising a boot coupled to the frame and configured to conform to a contour of the surface.

20. A system according to claim 10 further comprising a cover coupled to the frame opposite the surface relative to the flexible elastomeric membrane, wherein the cover is at least partially translucent.

* * * * *